CORROSION PROTECTION OF BURIED METAL OBJECTS

William Harry Culver, Bryan, Tex., assignor to Pennsalt Chemicals Corporation, Philadelphia, Pa.
No Drawing. Filed Apr. 1, 1969, Ser. No. 812,403
Int. Cl. C23f 15/00
U.S. Cl. 117—121      8 Claims

ABSTRACT OF THE DISCLOSURE

Ferrous metal objects, e.g., tanks and pipe, are wrapped in flexible wrapping material that is coated or impregnated with calcium arsenate to protect the metal from corrosion when buried in the soil.

---

This invention relates to the protection from corrosion of ferrous metal objects when buried in the soil, especially steel pipeline and the like. More particularly, this invention concerns flexible wrapping material that is coated or impregnated with a small but effective amount of calcium arsenate to inhibit the corrosion of ferrous metal objects wrapped therewith, subsequent to their burial in soil having a corrosive action thereon.

U.S. Pat. No. 3,168,455, to P. Shapiro, L. V. Collings and T. O. Counts, describes a means for retarding the corrosion of ferrous metal objects buried or partial buried in the soil or to permit a reduction in current requirements of an ordinary cathodic protection system for reducing corrosion of said objects which comprises providing in the soil adjacent to said object an effective quantity of calcium arsenate. There are several disadvantages to this described procedure. Firstly, there is the reluctance on the part of construction workers, such as those laying steel pipelines or installing tanks, to judiciously apply the granular or powdery calcium arsenate, in dry form or aqueous slurry form, to the soil adjacent to the ferrous metal object in the proper manner and amount. Moreover, the extremely toxic nature of calcium arsenate, especially dangerous in bulk form, presents a serious health hazard to these unsophisticated and chemically unknowledgeable construction men, and to livestock which might venture into the work area. In addition, as recognized in U.S. 3,168,455, rain water will have a leaching effect on the calcium arsenate and wash it away from the buried metal object making this protection method uncertain and of unpredictable duration, a possibility which is lessened by the present invention. Moreover, the addition of the protective chemical directly to the soil adjacent to the metal object and mixing therewith is inefficient and requires excessive quantities of chemical to achieve corrosion protection. For instance, although U.S. 3,168,455 asserts generally that from about 10 to 140 grams of arsenate compound per square foot of steel surface to be protected is added to the soil between the object and the anode of a cathodic protection system, the specific teachings of the patent show that it is necessary to mix about two percent calcium arsenate with the surrounding soil in order to obtain an effective concentration at the metal surface. Other examples show that a practical range of calcium arsenate used in the patented method must be from 35 to 199 grams/sq. ft. In addition, the described method of application by mixing with the soil does not reasonably ensure that all of the surface of the metal is adequately contacted with calcium arsenate.

The present invention provides a means to use calcium arsenate for inhibiting corrosion of soil-buried ferrous metal objects and stuctures that is free of the aforementioned disadvantages inherent in the prior art procedures.

An embodiment of this invention comprises a ferrous metal object, e.g., steel pipe, covered with a layer of flexible wrapping material coated or impregnated with a small but effective amount of calcium arsenate to inhibit the corrosive effects of soil in which said object is buried. As an advantage of this invention, the metal object arrives at the construction site already equipped with its corrosion protective means and no messy and dangerous handling of bulk calcium arsenate is required. When the wrapped pipe or the like is deposited in the soil, the coating of calcium arsenate thereon provides long lasting corrosion protection always adjacent to the metal without wastage of material, the chemical also being comparatively resistant to leaching and removal by rain water. There is also present an effective concentration of calcium arsenate adjacent to the metal surface using a minimum amount of the chemical. When, after a lengthy period of up to several years, the wrapping material may decompose due to microbiological action in the soil, the residual calcium arsenate is left uniformly deposited in the soil immediately adjacent to the metal where it will continue to offer additional protection against corrosion. In accordance with this invention, the amount of calcium arsenate required to effectively inhibit corrosion (or to permit drastic cuts in current requirements when an auxiliary cathodic protection system is employed) is reduced to about 10 to about 25 grams of calcium arsenate per square foot of surface.

The flexible wrapping material that is used as the overlay containing the calcium arsenate for wrapping the metal object may be, for example, paper or flexible plastic film such as plasticized polyvinyl chloride resin or the polyolefins, e.g. polyethylene, polypropylene and the like. When plastic film is employed, the appropriate amount of calcium arsenate may be blended with the melted resin prior to its extrusion into film by conventional means, or the extruded film can be coated with calcium arsenate as by the paper coating operation described below. The preferred wrapping material is paper and kraft paper (from unbleached sulfate pulp) is most preferred because of its low cost and high strength. The thickness of the paper is not critical and can range from about 10 to 150 pound kraft in practical application. The calcium arsenate can be provided as a uniform impregnant throughout by mixing the powdery calcium arsenate into the pulp stock, such as by addition to the beater slurry, prior to the sheet forming (Fourdrinier) operation. The calcium arsenate may alternatively be applied as a coating to one or both sides of the sheet paper using conventional paper coating techniques. The calcium arsenate is, as mentioned above, in finely-divided form, preferably at least about 95% of which should pass through a 325 mesh (Tyler) screen and substantially all through a 60 mesh screen. The efficacy of the coating may be enhanced by combining the calcium arsenate with a typical pigment or barrier coating material for example, clays, talcs, calcium carbonate, calcium sulfate, silica, casein, starches, synthetic rubber latex, acrylic resins, polyvinyl acetate, paraffin wax, polyethylene, ethylene-vinyl acetate copolymer, and cellulose derivatives. If desired, the calcium arsenate can be laminated within or between paper sheets or plastic film so that the composition will not come into contact with persons applying the wrapping material to the metal object.

In a preferred embodiment of this invention the calcium arsenate composition will contain from about 0.1 to about 2 parts of a surface active agent or from about 0.5 to about 10 parts of a polyphosphate detergent per 100 parts by weight of the calcium arsenate, or in the most preferred embodiment, a mixture of both the surfactant and polyphosphate detergent compound in the foregoing amounts. It has been found that these detergent and surfactant ingredients enhance the performance of the calcium arsenate in retarding corrosion of the buried ferrous metal structures.

Representative polyphosphate detergents are tetrasodium pyrophosphate, pentasodium triphosphate, sodium hexametaphosphate, sodium tripolyphosphate, and the potassium analogs thereof. The surface active agent may be of the anionic, cationic or nonionic type. Representative anionic surfactants are sodium stearate, potassium laurate, morpholine oleate, sodium lauryl sulfate, potassium lauryl sulfate, sodium 2-ethyl hexyl sulfate, sodium xylene sulfonate, the sodium alkyl benzene sulfonates, sodium naphthalene sulfonate, potassium naphthalene sulfate, sodium alkyl naphthalene sulfonate, potassium alkyl naphthalene sulfonate, sodium sulfosuccionate, sodium oleic acid sulfonate, sodium castor oil sulfonate, and the like. Representative of cationic surfactants are cetyltriethylammonium chloride,
diethylmethyl-(2-oleomidoethyl) ammonium methyl sulfate,
cetyl trimethylammonium bromide,
dimethyl distearyl ammonium chloride,
octadecyltrimethylammonium chloride,
stearomidopropyldimethyl-$\beta$-hydroxyethylammonium nitrate,
stearamidopropyldimethyl-$\beta$-hydroxyethylammonium dihydrogen phosphate,
N,N-dimethyl-N-benzyl-N-octadecyl ammonium chloride,
N,N-dimethyl-N-hydroxyethyl-N-dodecyl ammonium chloride,
N,N-dimethyl-N-benzyl-N-octadecenyl ammonium chloride,
N,N-dimethyl-N-benzyl-N-dodecyl ammonium chloride,
N,N-dimethyl-N-hydroxyethyl-N-benzyl ammonium chloride,
hexadecyl pyridinium chloride,
hexadecyl triethyl ammonium bromide,
octadecylbenzyl trimethyl ammonium methosulfate,
isopropylnaphthyl trimethyl ammonium chloride,
octadecyl pyridinium bromide,
hexadecyl methyl piperidinium, methosulfate,
dodecyl hydroxyethyl morpholinium bromide,
N-cetyl-N-ethyl morpholinium ethosulfate, and the like. Representative nonionic surfactants are the polyoxyethylene fatty alcohol ethers, polyglycol fatty acid esters, polyoxyethylene modified fatty acid esters, polyoxyethylene polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, polyhydric alcohol fatty acid di-, tri-, etc. esters, oxidized fatty oils, and the like. The commercially available surface active agents are catalogued in "Detergents and Emulsifiers" John W. McCutcheon, Inc., 1965.

Actual environmental testing for corrosion resistance of steel pipe wrapped in paper treated with calcium arsenate was carried out to illustrate the results of this invention as follows. Ten 6 foot sections of six inch diameter ASTM, A 53, Grade B, Schedule 40 steel pipe, capped at both ends by welded 3/16 inch steel plates beveled and ground smooth, were sandblasted just prior to the wrapping operation and protected from atmospheric moisture with sheets of polyethylene film during the interim period. The paper, applied from four inch wide rolls in a single layer with a 1 to 1½ inch overlap, was 50 pound natural kraft, i.e., weight of 50 pounds per 1000 square feet). The specimens, which are described more fully below, were buried to a depth of about 30 inches in the moist, acid type loam soil of the Puyallup Valley near Tacoma, Washington, an area regarded as being especially corrosive to buried metal.

The pipe sections were laid end to end with about one foot between sections, the sequence from south to north being:

|  | Example No. |
|---|---|
| South end | 10 |
| Do | 1 |
| Do | 2 |
| Do | 9 |
| Do | 3 |
| Do | 4 |
| Do | 8 |
| Do | 5 |
| Do | 6 |
| North end | 7 |

In the first two examples, the kraft paper was coated with a composition comprised of about 50% calcium arsenate dispersed in aqueous medium containing a small amount of polyvinyl acetate as a coating aid.

EXAMPLE 1

The paper was wrapped with the 50 pound kraft paper coated with 23.7 lbs./1000 sq. ft. (10.75 grams/ft.$^2$) of calcium arsenate composition containing about 4.5 wt. percent of tetrasodium pyrophosphate and about 0.5 wt. percent of a non-ionic surfactant.

EXAMPLE 2

This paper was covered by a laminated paper wrapping wherein the base paper covering was the same as in the previous example and the top covering was 11 pound natural kraft paper.

In the next four examples, the calcium arsenate used in the coating contained no detergent or surfactant. The reference to "laminated" refers to the use of a covering layer of the 11 pound kraft.

| Example No. | Weight of calcium arsenate coating | |
|---|---|---|
|  | Lbs./1,000 sq. ft. | Grams/ sq. ft. |
| 3 | 22 | 10 |
| 4 | 39.5 | 18 |
| 5 (laminated) | 22 | 10 |
| 6 (laminated) | 39.5 | 18 |

Two years and 3 weeks after burial the above-described pipe specimens and control specimens were recovered and examined with the following observations:

Example No. 1: The paper was in good condition and easily removed after saturation with water. The pipe surface was largely clear and bright looking, similar in appearance to the original sand blasted pipe although there were a few dark spots. Analysis of the paper showed its iron content to be nil.

Example No. 2: The results were essentially the same as in Example 1 except there were fewer of the minor dark discolorations on the pipe surface. After subsequent exposure to the rather corrosive atmosphere adjacent to a chlorine plant, the pipes of these two examples remained rust-free.

Examples 3, 4, 5 and 6: The results, which were essentially the same for the four specimens, showed good protection of the steel pipe which, although blackened in spots, was still clean and fairly bright. The paper had begun to deteriorate. These pipes were covered with a thin film of rust following exposure to the atmosphere.

Examples 7, 8, 9 and 10: These pipes were the control samples using kraft paper free of calcium arsenate as the wrapping. Following exposure to the soil, the surfaces of the pipes were covered with rust scale and severely pitted due to corrosion. The paper had rotted away.

It will be apparent to those skilled in the art that the foregoing examples are illustrative and not to be construed as limitative of the invention which is subject to variation and modifications without departing from its spirit and scope as defined by the appended claims.

I claim:

1. A ferrous metal object wrapped in flexible wrapping material and buried in the soil, said wrapping material coated or impregnated with from about 10 to about 25 grams of calcium arsenate per square foot of surface to inhibit corrosion of said buried ferrous metal object.

2. The article according to claim 1 wherein the flexible wrapping material is paper.

3. The article according to claim 1 wherein the flexible wrapping material is a plastic film.

4. The article according to claim 1 wherein the calcium arsenate is combined in admixture with at least one substance from the class consisting of a surface active agent and a polyphosphate detergent.

5. The method of protecting a ferrous metal object from corrosion when buried in the soil which comprises wrapping said object, prior to the burial thereof, in a flexible wrapping material coated or impregnated with from about 10 to about 25 grams of calcium arsenate per square foot of surface.

6. The method according to claim 5 wherein the flexible wrapping material is paper.

7. The method according to claim 5 wherein the flexible wrapping material is a plastic film.

8. The method according to claim 5 wherein the calcium arsenate is combined in admixture with at least one substance from the class consisting of a surface active agent and a polyphosphate detergent.

References Cited

UNITED STATES PATENTS

| | | | |
|---|---|---|---|
| 3,060,066 | 10/1962 | Ross et al. | 148—6.15 |
| 3,168,455 | 2/1965 | Shapiro et al. | 204—148 X |
| 3,277,040 | 10/1966 | Barkis et al. | 117—138.8 X |
| 3,388,723 | 6/1968 | McNulty | 117—138.8 UX |
| 2,643,176 | 6/1953 | Wachter et al. | 21—2.5 |
| 1,877,504 | 9/1932 | Grebe et al. | 252—387 X |
| 1,698,973 | 1/1929 | Tseng | 252—387 X |
| 3,507,807 | 4/1970 | Palikko | 21—2.5 X |

RALPH S. KENDALL, Primary Examiner

C. WESTON, Assistant Examiner

U.S. Cl. X.R.

21—2.5; 117—152, 138.8 R; 138—145, 146; 156—184